US011907316B2

(12) United States Patent
Brown

(10) Patent No.: US 11,907,316 B2
(45) Date of Patent: Feb. 20, 2024

(54) PROCESSOR-IMPLEMENTED METHOD, COMPUTING SYSTEM AND COMPUTER PROGRAM FOR INVOKING A SEARCH

(71) Applicant: Richard S. Brown, Thornhill (CA)

(72) Inventor: Richard S. Brown, Thornhill (CA)

(*) Notice: Subject to any disclaimer, the term of this patent is extended or adjusted under 35 U.S.C. 154(b) by 0 days.

(21) Appl. No.: 17/011,660

(22) Filed: Sep. 3, 2020

(65) Prior Publication Data

US 2020/0401645 A1 Dec. 24, 2020

Related U.S. Application Data

(63) Continuation-in-part of application No. 16/039,462, filed on Jul. 19, 2018, now Pat. No. 10,769,225, which is a continuation of application No. PCT/CA2017/050966, filed on Aug. 15, 2017.

(30) Foreign Application Priority Data

Aug. 15, 2016 (CA) .................................. CA 2939395

(51) Int. Cl.
G06F 3/04842 (2022.01)
G06F 40/134 (2020.01)
H04L 51/08 (2022.01)
G06F 16/955 (2019.01)
H04W 4/14 (2009.01)
G06F 3/0483 (2013.01)
G06F 16/9538 (2019.01)
H04L 5/08 (2006.01)

(52) U.S. Cl.
CPC ...... *G06F 16/9538* (2019.01); *G06F 3/04842* (2013.01); *G06F 16/9558* (2019.01); *G06F 40/134* (2020.01); *H04L 5/08* (2013.01); *H04W 4/14* (2013.01); *G06F 3/0483* (2013.01)

(58) Field of Classification Search
CPC ............. G06F 16/9538; G06F 16/9558; G06F 40/134; G06F 3/04842; G06F 3/0483; H04L 51/08; H04W 4/14
See application file for complete search history.

(56) References Cited

U.S. PATENT DOCUMENTS 8,433,719 B1* 4/2013 Choc ..................... G06F 16/958
707/754
2005/0262121 A1* 11/2005 Cesare .................. G06F 16/215
2015/0347532 A1* 12/2015 Shaw .................... G06F 3/0484
707/722

(Continued)

*Primary Examiner* — Amy Ng
*Assistant Examiner* — Antonio J Caiado
(74) *Attorney, Agent, or Firm* — Ralph E. Jocke; WALKER & JOCKE

(57) ABSTRACT

A processor-implemented method of creating a hyperlink from a text messaging text entry field in a text messaging app on a user's mobile device includes the app assigning one or more keyboard characters as control characters which designate a start of a text search string and an end of a text search string. The user enters text including the control characters into the text messaging app text entry field. Upon the user activating a send command to send a text message that includes the start and end control characters, displaying the search string as a hyperlinked text in the message thread which is selectable to invoke a search outside of the text messaging app.

28 Claims, 4 Drawing Sheets

(56) References Cited

U.S. PATENT DOCUMENTS

| | | | |
|---|---|---|---|
| 2016/0006856 A1* | 1/2016 | Bruno | G06F 16/951 |
| | | | 715/809 |
| 2016/0011758 A1* | 1/2016 | Dornbush | H04L 65/601 |
| | | | 348/14.03 |
| 2016/0328206 A1* | 11/2016 | Nakaoka | G06F 16/9566 |
| 2017/0193087 A1* | 7/2017 | Savliwala | G06F 40/284 |

* cited by examiner

PROCESSOR-IMPLEMENTED METHOD, COMPUTING SYSTEM AND COMPUTER PROGRAM FOR INVOKING A SEARCH

CROSS-REFERENCE TO RELATED APPLICATION

This application is a continuation in part application of U.S. patent application Ser. No. 16/039,462 filed on Jul. 19, 2018, which claims priority to Canadian Patent Application No. 2,939,395 filed on Aug. 15, 2016 entitled "METHOD AND DEVICE FOR INVOKING A SEARCH FROM A TEXT MESSAGE", the contents of which are incorporated herein by reference.

FIELD OF TECHNOLOGY

Exemplary arrangements relate generally to applications on computing devices, and more particularly to a processor-implemented method, computing system and computer program for creating a hyperlink and invoking a search.

BACKGROUND

Computers and mobile communications devices, for example cellular telephones, tablets, smartphones, smart watches and the like, have become a very popular means of accessing information sources and resources of all types for many daily activities, and for communicating with others for both business and personal purposes. In most populated regions, such digital devices provide individuals with virtually constant access to information and communications via the Internet.

Mobile telephones (also known as cellular telephones or smartphones) have the ability to connect to the internet either through a cellular network by conventional cellular technology, or through a local network utilizing 'Wi-Fi', and as such have become a particularly useful and widespread example of this. Mobile telephones are small enough to be easily carried virtually anywhere, and have evolved to provide a myriad of mobile device application programs or "apps" that allow users to perform various tasks in addition to telephony and connectivity to the Internet.

However, as a compromise in favor of mobility and ease of handling, mobile telephones suffer from the drawback that the display is very small. It is therefore not practical to use multiple apps simultaneously the way one can on a computer, where the display is large enough that windows generated by different applications can display data, interfaces etc. adjacent to other windows. The size of the display in a mobile telephone lends itself to displaying only one app's interface at a time. For the same reason, mobile telephones necessarily have very small keyboards for data entry, which makes typing difficult for many users. In many cases mobile telephones provide the keyboard as part of the touch-screen display, which further reduces the amount of display area available for app interfaces and data.

Because the keyboard is so small, any process that can reduce the amount of typing required by the user to perform a task is considered to be advantageous. It reduces both the time spent by the user performing tasks, and the user's frustration level with the inevitable typographical errors attendant to the small size of the keyboard.

Also, because the display area is so small and is practically able to provide only one app's interface at a time for use by the user, any process that can facilitate toggling between the interfaces of different apps is advantageous.

It would accordingly be advantageous to equip a mobile device with a process that reduces the amount of typing required by the user, thus reducing the time taken to perform a task on the mobile device and opportunities for errors. It would further be advantageous to reduce or eliminate the steps required to toggle between different apps that are being used to perform related tasks.

SUMMARY

In accordance with an aspect of exemplary arrangements, there is provided a processor-implemented method of creating a hyperlink from a text messaging text entry field in a text messaging app on a user's mobile device, the method comprising assigning within the messaging app one or more keyboard characters as control characters, also referred to herein as control indicators or indicators, respectively designating a start of a text search string and an end of a text search string, also referred to herein as search string text; enabling the user to enter text including the control characters into the text messaging app text entry field; and upon the user activating a send command to send a text message that includes the start and end control characters defining the bounds of a search text string, displaying the search string as a hyperlinked text in the message thread selectable to invoke a search outside of the text messaging app.

In an exemplary embodiment, for invoking a search, the method comprises automatically initiating a search by presenting the search text string to a search engine interface to return results based on the search, in the event that a user selects the hyperlinked search string text in the message of the message thread.

In accordance with another aspect of exemplary arrangements, there is provided a computing system, also referred to herein as a computing device, comprising processing structure configured to create a hyperlink from a text messaging text entry field in a text messaging app operating on the computing system by assigning within the messaging app one or more keyboard characters as control characters respectively designating a start of a text search string and an end of a text search string; enabling the user to enter text including the control characters into the text messaging app text entry field; and upon the user activating a send command to send a text message that includes the start and end control characters defining the bounds of a search text string, displaying the search string as a hyperlinked text in the message thread selectable to invoke a search outside of the text messaging app.

In another exemplary embodiment, the processing structure is further configured to initiate a search by, in response to a user selecting the hyperlinked search string text in the message of the message thread, automatically presenting the search text string to a search engine interface to return results based on the search of the search text string.

In accordance with another aspect of exemplary arrangements, there is provided a non-transitory processor-readable medium embodying a computer program for creating a hyperlink from a text messaging text entry field in a text messaging app on a user's mobile device, the computer program comprising processor-readable code or instructions for assigning within the messaging app one or more keyboard characters as control characters respectively designating a start of a text search string and an end of a text search string; processor-readable code for enabling the user to enter text including the control characters into the text messaging app text entry field; and processor-readable code for, upon the user activating a send command to send a text message that includes the start and end control characters defining the bounds of a search text string, displaying the search string as a hyperlinked text in the message thread selectable to invoke a search outside of the text messaging app.

In exemplary embodiments, the computer program comprises processor-readable code for automatically initiating a search by presenting the search text string to a search engine interface to return results based on the search in the event that a user selects the hyperlinked search string text in the message of the message thread.

According to another aspect of exemplary arrangements, there is provided a processor-implemented method of creating a hyperlink from a text string in a text entry application on a user's computing device, the method comprising assigning within the application one or more keyboard characters as control characters respectively designating a start of a text search string and an end of a text search string; enabling the user to enter text including the control characters into the text entry application; and upon the user indicating the completion of entry of a text bracketed by the control characters into the text entry application defining the bounds of a search string text, displaying the search string text as a hyperlinked text in the application selectable to invoke a search outside of the text entry application.

In another exemplary embodiment, the computing device is a mobile computing device. In exemplary embodiments, the application is a text messaging application. In other exemplary embodiments, the application is one or more of: a word processing application, a spread sheeting application, and a presentation application. However, these embodiments are merely exemplary and the exemplary application may be any communications application or text entry application that is operative to allow users to communicate or enter data via text entry, video, audio, or any other communications method or data entry method.

In another exemplary embodiment, the method is for invoking a search and comprises automatically initiating a search by presenting the search text string to a search engine interface to return results based on the search, in the event that a user selects the hyperlinked search string text in the application.

In another exemplary embodiment, initiating a search by presenting the search text string to a search engine interface to return results based on the search comprises copying the search text string within the message, invoking a browser, also referred to herein as a web browser application, and causing the browser to initiate the search by presenting the search text string to a search engine interface to return results based on the search of the search text string. However, it should be understood that presenting the search string text to a search engine interface or a web browser application may, as shown in the exemplary embodiments discussed herein, include any method of transmitting the search string text to the web browser application or search engine interface.

In another exemplary embodiment, causing the browser to initiate the search by presenting the search text string to a search engine interface to return results based on the search of the search text string comprises opening a search engine user interface in the browser, pasting the search text string into a search field of the search engine user interface, and initiating the search to return results based on the search of the search text string.

In another exemplary embodiment, causing the browser to initiate the search to return results based on the search of the search text string comprises pasting the search text string into an address bar of the browser; and causing the browser to programmatically initiate the search using the search text string in the address bar of the browser.

In another exemplary embodiment, initiating a search by presenting the search text string to a search engine interface to return results based on the search comprises automatically constructing and sending a programmatic call to a search engine application programming interface (API); and receiving and displaying search results received from the API.

In accordance with another aspect of exemplary arrangements, there is provided a computing system comprising processing structure configured to create a hyperlink from a text string in a text entry application operating on the computing system by assigning within the application one or more keyboard characters as control characters respectively designating a start of a text search string and an end of a text search string; enabling the user to enter text including the control characters into the text entry application; and upon the user indicating the completion of entry of a text bracketed by the control characters into the text entry application defining the bounds of a search string text, displaying the search string text as a hyperlinked text in the application selectable to invoke a search outside of the text entry application.

In accordance with another aspect of exemplary arrangements, there is provided a non-transitory processor-readable medium embodying a computer program for creating a hyperlink from a text string in a text entry application on a user's computing device, the computer program comprising processor-readable code for assigning within the application one or more keyboard characters as control characters respectively designating a start of a text search string and an end of a text search string; processor-readable code for enabling the user to enter text including the control characters into the text entry application; and processor-readable code for, upon the user indicating the completion of entry of a text bracketed by the control characters into the text entry application defining the bounds of a search text string, displaying the search string as a hyperlinked text in the application selectable to invoke a search outside of the text entry application.

BRIEF DESCRIPTION OF THE DRAWINGS

The drawings illustrate by way of example the exemplary arrangements described herein.

DETAILED DESCRIPTION

Figure 1:
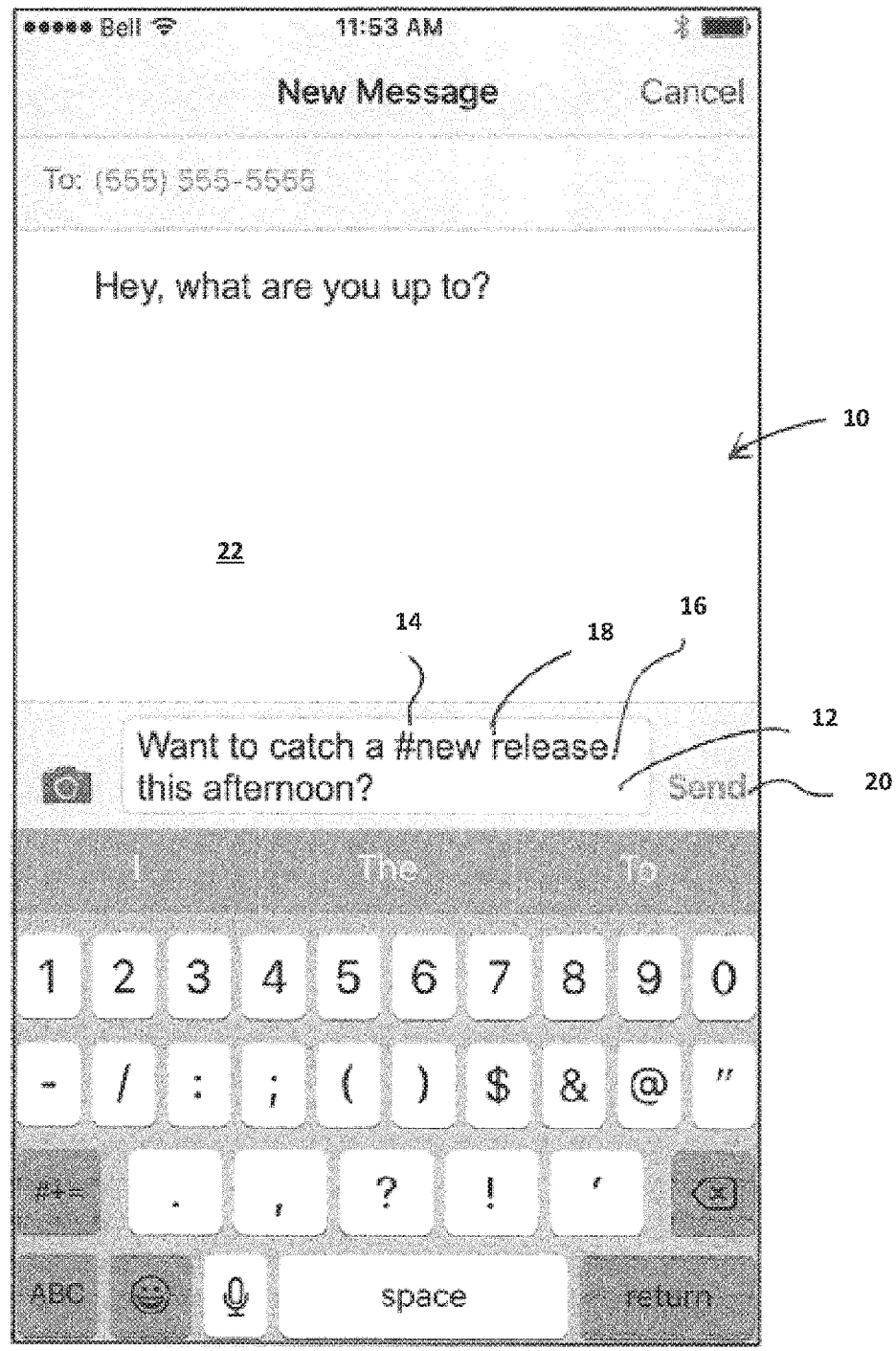
FIG. 1 is a screen shot of the exemplary user interface in a first app having a text entry field for receiving a text string, showing a text string input to utilize the method of the exemplary arrangements.

The exemplary arrangements will be described in the context of performing related tasks on a mobile device such as a "smartphone" by toggling between a text messaging program, for example an SMS app, and a web browser application or a search engine. However, the exemplary arrangements are applicable to toggling between other applications, preferably but not exclusively applications being run on the smaller form-factor of a mobile device, so as to enable selectively invoking searches and displaying their results as will be described.

In the exemplary arrangements the search engine is accessed via an Internet-enabled browser, also referred to herein as a web browser application. However, it will be appreciated that the exemplary arrangements may be applied in like manner to accessing searches from other types of apps such as other applications stored on the processor readable medium, or accessible from or to the processor readable medium. Therefore, it will be appreciated that the method of the exemplary arrangements can be implemented in any digital communications or text entry environment offering an audio or visual interface capable of outputting or displaying the selected text search string as a hyperlink and communicating with a web browser application or a search engine. As used herein, the term web browser application includes any application or software that can use the Internet. The term web browser application includes mobile device applications or software that include a search engine as part thereof. The term web browser application includes any application or software that can use the internet and that includes an API for directly receiving programmatic calls to invoke searches. The term web browser application includes any application or software is operative to invoke a search by a URL Search Query. For example, entities that have websites that operate on a web browser application, such as YouTube™, have mobile device applications that include software instructions to perform the same operations and search functions as their website. The term web browser application further includes separate web browser applications outside of the text entry application. For example, if a user selects a hyperlink in the text entry application or other communications application, a web search of the search string text is initiated in a separate or external web browser application that is included in the memory of the mobile device, such as the mobile device applications of Safari™ or Google Chrome™, for example. As another example of a separate web browser application and its operations, in the Apple iMessage™ application, when a user sends a hyperlink, the hyperlink is displayed in the message thread or message window. When a user selects the hyperlink in the message thread, the Apple iMessage™ application toggles to the Safari™ application to view the hyperlink. The term web browser application includes in-app web browsers or built in web browsers that are included in the software instructions of the text entry application or communications application. For example, if a user selects a hyperlink within the text entry application, the text entry application toggles to an in-app web browser to display the webpage that includes the results of the web search of the search string text. Examples of such in-app web browser applications include the in-app browsers of the mobile device applications of Instagram™, Facebook Messenger™, or LinkedIn™, for example. As another example of an in-app browser or a built in browser, is the messaging application Kik™, when a user sends a hyperlink to another user, the hyperlink shows up in the message thread as a hyperlink. When a user subsequently selects the hyperlink in the message thread, the Kik™ application toggles to its own built in web browser application to view the results of the hyperlink. The term web browser application further includes pop-up web browser applications. For example, in communications applications including software instructions for a pop-up web browser application, if the user selects the hyperlink in the text entry application, the text entry application opens a pop-up window corresponding to the user selected hyperlink in front of the user interface of the communications application. The results of the web search initiated by user selection of the hyperlink are displayed in the pop-up window that is arranged in front of the user interface of the message thread of the text entry application or communications application. Examples of such pop-up web browser applications are included in the mobile device applications of WhatsApp™ and YouTube™, for example. The term web browser application further includes external mobile applications stored in the memory of the mobile device or accessible from or to the mobile device, also referred to herein as other mobile applications. For example, if a user selects the hyperlink in the text entry application and the hyperlink includes an indication of a specific search engine corresponding to a search engine included in an external or other mobile device applications stored in the memory of the mobile device or accessible from or to the mobile device, the application according to the exemplary embodiments causes the external/other mobile device application to open and run, and to initiate and perform the web search of the search string text through the search engine of the external/other mobile device application. The external/other mobile device application is operative to display the results of the web search of the search string text in a display page, or user interface of the external/other mobile device application, or the results may be received and displayed in the user interface of the application according to the exemplary arrangements. Examples of such external or other mobile device applications include, as previously discussed, the YouTube™ mobile device application. Still further, the term web browser application includes web browser applications stored on or accessible from or to the user's mobile device that are operative to run or operate a text entry application or communications application. For example, the web browser applications such as the mobile device applications Safari™ or Google Chrome™ are operative to run websites. Such websites may have communications applications including, for example, a text entry application, a messaging application, a video communications application, or an audio communications application as part thereof, for example, Facebook Messenger™ or Zoom™. If a user selects a hyperlink displayed in such a communications application running on a web browser application, the application according to the exemplary embodiment is operative to cause the web search of the search string text to be initiated within the web browser application running the website, and the results are displayed in a tab or window of the web browser application running the website. For example, when a user is using Facebook.com on their laptop or mobile phone, and the website is running on a web browser application such as Safari™ or Google Chrome™, if the user selects a hyperlink that has been posted to a social media feed on the Facebook.com website, the web browser application that the website is running on is operative to open a new web browser tab or new web browser window to view the results corresponding to the hyperlink. A further example would include Facebook Messenger™ that is accessible on the Facebook.com website that is being run on a web browser application such as Safari™. In Facebook Messenger™, if a user sends another user a hyperlink in a message thread of Facebook Messenger™, if the user clicks or otherwise selects the hyperlink, the web browser application running the Facebook.com website is operative to open a new browser tab or new window to display results corresponding to the hyperlink. However, it should be understood that the term web browser application includes any application or software that can use the internet, and that the term web browser application includes all web applications, progressive web applications, websites, mobile applications, desktop applications, or any other application or software that can use the internet, or uses the internet to function and to update data. It should further be understood that a web browser application included as part of the communications application or text entry application, in-app web browser applications, pop-up browser applications, or web browser applications included in an external or other application stored in the memory of the mobile device, or accessible from or to the mobile device, may all be classified or defined as a separate web browser applications outside of the text entry application or communications application. These web browser applications may be classified as separate web browser applications because they are typically structured as additions to the software code of the text entry application or communications application. It should further be understood that all of these web browser locations as defined herein encompass embodiments classified as being included in the software code of the communications application or text entry application, as well as embodiments classified as being additions to the software code of the communications application or text entry application.

Figure 4:
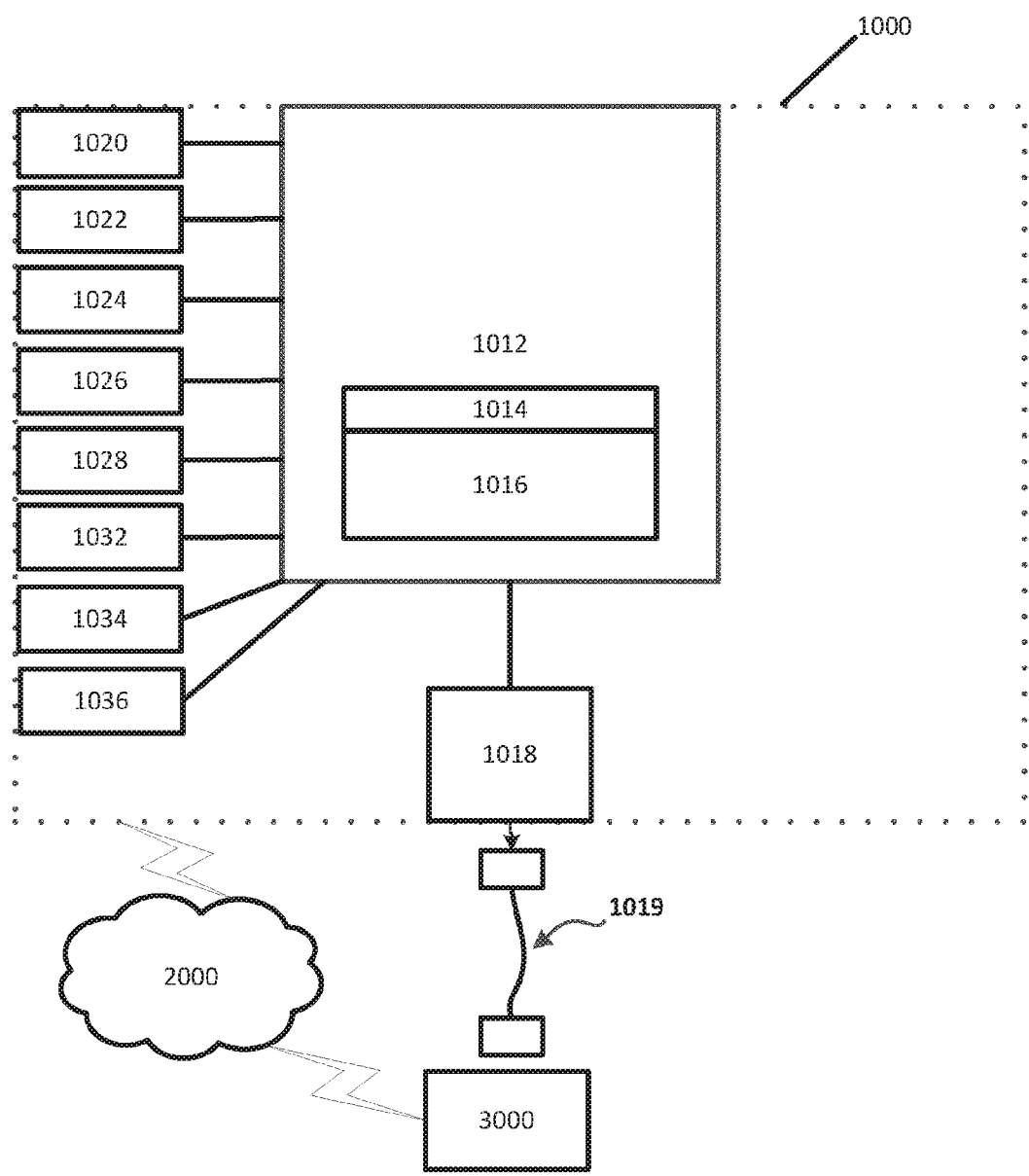
FIG. 4 is a schematic block diagram of components of an exemplary system according to an exemplary embodiment, including the exemplary mobile system in further detail and an exemplary remote processing structure.

In exemplary embodiments, the processes described herein are implemented on mobile devices such as exemplary mobile system 1000 shown in FIG. 4. In this exemplary embodiment, each mobile system 1000 is a single mobile device in the form of a smartphone powered by an internal power supply such as a battery (not shown), which provides power to a main board 1012, which in turn converts the power as required for logic circuitry, and provides the power to various other components. The exemplary mobile system 1000 may include at least one input device in operative connection therewith. In the exemplary embodiments, the at least one input device may include at least one of a touch screen 1020 displaying a user interface 10 or 30 as will be described below, physical buttons 1022, cellular transceiver 1024, a wireless Bluetooth™ transceiver 1026, a Wi-Fi™ transceiver 1028, and/or other wireless transceiver (s) (not shown), speaker 1032, microphone 1034, and wired communications interface 1018, as well as other components not shown such as a display screen, a camera, a motion or light sensor, or a camera operative to sense motion or light. In the exemplary embodiments, the at least one input device is operatively connected to the main board 1012 to receive power and to communicate with a central processor 1016. In this exemplary embodiment, the exemplary central processor 1016 is a single microcontroller and is in operative communication with an exemplary onboard processor-readable memory 1014 configured to collect and store various pieces of data including operational data and processor-readable program code or instructions for programming the central processor 1016 to operate various user-interactive programs on the mobile system 1000 as well as to operate the various components of the mobile system 1000. In alternative exemplary arrangements, the processor-readable memory 1014 may be "off-board" and in operative connection with other components of the system. In alternative exemplary embodiments, central processor 1016 may be a plurality of coordinated processors. The exemplary central processor 1016 may include exemplary circuitry comprising one or more circuits including processors, which for purposes hereof correspond to any electronic device that is configured via circuit executable instructions that can be implemented in either hardware circuits, software, firmware, or applications that are operative to enable the circuitry to process data and carry out the other actions and operations that are described herein. For example, the circuitry may include circuits that correspond to one or more of a combination of a CPU, FPGA, ASIC, or any other integrated circuit or other type circuit that is capable of processing data. The processors may be included in a computer, server, terminal, or other type of electronic device. Further, as will be described in more detail later on, the exemplary circuitry of central processor 1016 may include, or in operative connection therewith, one or more processor readable memories 1014 that correspond to one or more of volatile or non-volatile memory such as random access memory, flash memory, magnetic memory, optical memory, solid-state memory, or other devices that are operative to store computer executable instructions and/or data. The computer executable instructions, which will be described later in more detail, may include instructions in any of a plurality of programming languages and formats, including without limitation, routines, subroutines, programs, threads of execution, scripts, objects, methodologies, and functions which carry out the actions and operations described herein. The structures of the circuitry of central processor 1016 may include, correspond to, and utilize principles that are described in the text entitled Microprocessor Architecture, Programming, and Applications With The 8085 by Ramesh S. Gaonker (Prentice Hall, 2002), which is incorporated herein by reference in its entirety. Of course, it should be understood that these circuitry structures are exemplary and in other embodiments, other circuitry structures for storing, processing, resolving and outputting signals, record data, and information may be used.

In exemplary embodiments, the exemplary wired communications interface 1018 is a USB (Universal Serial Bus) that can receive an external USB cable 1019 for enabling data communications with remote processing structure 3000 via one of its own USB ports in its communications interface such that data can be received by and sent to remote processing structure 3000. In an alternative exemplary embodiment, wired communications interface 1018 is configured to operate according to a different form-factor and/or protocol, such as Lightning™, Thunderbolt™, Firewire™ or some other wired interface. In exemplary arrangements, however, communications between mobile system 1000 and remote processing structure 3000 is encrypted and conveyed via a wireless connection through communications network 2000 such as the Internet including a Wi-Fi base station in communication with Wi-Fi transceiver 1028. Of course, it should be understood that these wired and wireless communications connections are merely exemplary, and in other embodiments, other communications connections may be used.

In the exemplary embodiments, the exemplary mobile system 1000 performs processing steps described herein in response to the exemplary central processor 1016 executing one or more sequences of one or more instructions contained in a memory, such as the memory 1014. Such instructions may be read into the memory 1014 from another computer readable medium, such as but not limited to a hard disk or a removable media drive. One or more processors in a multi-processing arrangement may also be employed to execute the sequences of instructions contained in memory 1014. In alternative exemplary embodiments, hard-wired circuitry may be used in place of or in combination with software instructions. Thus, embodiments are not limited to any specific combination of hardware circuitry and software.

The exemplary mobile system 1000 includes at least one computer readable medium or memory for storing instructions programmed according to the teachings of the exemplary embodiments and for containing data structures, tables, records, or other data described herein. Examples of computer readable media include but are not limited to PROMs (EPROM, EEPROM, flash EPROM), DRAM, SRAM, SDRAM, or any other magnetic medium or compact discs, hard disks, floppy disks, tape, magneto-optical disks or any other processor-readable medium. Of course, it should be understood that these various computer readable media are merely exemplary, and in other embodiments, other computer readable media may be used.

Stored on any one or on a combination of computer readable media, the exemplary arrangements include software for controlling the mobile system 1000, for driving a device or devices for implementing the exemplary embodiments, and for enabling the mobile system 1000 to interact with a human user. Such software may include, for example, but is not limited to, device drivers, operating systems, development tools, and/or applications software. Such computer readable media further includes, for example, the computer program product of the exemplary arrangements, or aspects thereof, for performing all or a portion (if processing is distributed) of the processing performed in implementing aspects of the exemplary arrangements. Of course, this software is merely exemplary, and in other embodiments, other software may be used. In further exemplary embodiments, the central processor 1016 may be in operative connection with an artificial intelligence or machine learning device that is operative to improve and facilitate efficiency of the exemplary methods, operations, systems, arrangements and embodiments described herein.

The computer code devices of the exemplary arrangements may be any interpretable or executable code mechanism, including but not limited to scripts, interpretable programs, dynamic link libraries (DLLs), Java classes, and complete executable programs. Moreover, parts of the processing of the exemplary embodiments may be distributed for better performance, reliability, and/or cost. Of course, these computer code devices and arrangements are merely exemplary, and in other embodiments, other computer code devices and arrangements may be used.

The exemplary computer readable medium for providing instructions to an exemplary central processor 1016 may take many forms, for example, including but not limited to, non-volatile media, volatile media, and transmission media. Non-volatile media includes, for example, optical, magnetic disks, and magneto-optical disks, such as a hard disk or a removable media drive. Volatile media includes dynamic memory, such as the memory 1014. Transmission media includes physical cables or wires, but may also take the form of acoustic or light waves, such as those generated during radio wave or infrared data communications, for example Bluetooth™, Wi-Fi™, Near Field Communications (NFC), and the like. Of course, these forms of computer readable mediums are exemplary, and in other embodiments, other computer readable mediums may be used.

In exemplary arrangements, various forms of computer readable media may be involved in carrying out one or more sequences of one or more instructions to exemplary central processor 1016 for execution. For example, the instructions may initially be carried on a magnetic disk of another remote computer. The other remote computer can load the instructions for implementing all or a portion of the exemplary embodiments remotely into a dynamic memory and send the instructions over a communication line using a modem. A modem local to the mobile system 1000 may receive the data on the communication line and use an infrared transmitter to convert the data to an infrared signal. An infrared detector coupled to a bus can receive the data carried in the infrared signal and place the data on the bus. The bus carries the data to the memory 1014, from which the central processor 1016 retrieves and executes the instructions. The instructions received by the memory 1014 may optionally be stored on an external or selectively connectable storage device either before or after execution by central processor 1016. Of course, it should be understood that these methods of transmitting the processor executable instructions to memory 1014 to be executed by central processor 1016 are merely exemplary, and in other embodiments, other methods of transmitting the instructions to memory 1014 may be used.

It will be understood that additional components of the exemplary embodiments, such as status lights and audible indicators, though not shown in the drawings, may also be connected to central processor 1016 for use in operation of mobile system 1000.

While the exemplary mobile system 1000 is a single mobile device in this embodiment, mobile system 1000 may alternatively be implemented as multiple mobile devices in close-range communication with one another (such as but not limited to a wired USB or other connection or alternatively as a wireless Wi-Fi, Bluetooth, NFC, Zigbee, ANT, IEEE 802.15.4, or Z-Wave connection, for example). For example, mobile system 1000 may include a smartphone and a wrist-mountable computing device, each having respective microcontrollers that work in concert via the wired or wireless connection to achieve a desired result as described herein. The exemplary mobile system 1000 may alternatively be implemented in the form of a laptop computing device either alone or in combination with another device, a head-mountable computing device such as a Google Glass™ device either alone or in combination with another device, or a tablet or alternatively some other suitable system that can be carried with a user during typical daily activities. However, it should be understood that these forms of implementing the application according to the exemplary embodiments are by way of example only, and in other embodiments, other forms of implementing the application according to the exemplary embodiments may be used.

It will be understood that it is not necessary that all mobile system 1000s need be used in an overall system such as is described herein or be of the exact same construction. In one exemplary embodiment, a subject may make use of his or her own smartphone, which may employ an operating system from Android™, Apple™, Blackberry™ or some other producer, provisioned as described herein.

In this exemplary embodiment, the exemplary mobile device (not shown) is pre-programmed with an operating system package, as is well known, which typically includes at least one browser and at least one text messaging app. Alternatively or additionally, a text messaging app and/or browser app can be loaded onto the mobile device in conventional fashion. As used herein "text messaging" includes SMS, instant messaging, e-mail and all other platforms or programs or applications or websites that send text in an editable format.

FIG. 1 illustrates, by way of non-limiting example, the exemplary interface 10 of a popular SMS text messaging program. In the exemplary embodiment shown the "keys" for both typing and functions are displayed on the device display as is well known. In other exemplary embodiments a "physical" keyboard may be used in the same fashion. In still further embodiments, the mobile system 1000 may include suitable devices, or be in operative connection therewith, such as a projector and the memory 1014 may include processor readable instructions operative to project the keyboard onto a surface via light or laser projection, or in the air as a hologram, and the mobile system 1000 is further operative to record inputs to the at least one input device via user contact with an area on the surface or a portion of the hologram corresponding to a specific key. Of course, the keyboards described herein are merely exemplary, and in other embodiments, other keyboards may be used.

In the exemplary arrangements, one or more keyboard characters 14, 16 may be assigned as control characters, also referred to herein as indicators, respectively designating the start and end of a text search string 18 in the text messaging text entry field 12. For example, a first indicator may designate a start of search string text and a second indicator may designate an end of search string text. The control characters 14, 16 are preferably individual characters that are not normally used in a text message, or a string of characters that would rarely, if ever, appear together in a word or sentence in the relevant language (e.g. 'xx' in English). In exemplary embodiments, a pound sign '#' (more recently known as a "hash tag") is assigned as the text search string start character 14 and a period '.' is assigned as the text search string end character 16. However, this arrangement is merely exemplary, and in other embodiments, other arrangements may be used. For example, the control characters may be any arrangement of characters commonly displayed on a keyboard that are user selected and assignable to correspond to the indicators 14 and 16. While the control indicators 14 and 16 are described herein in terms of keyboard characters or keys, it should be understood that the control characters 14 and 16 may be spoken words or spoken indicators corresponding to the control indicators, audible indicators such as a buzzer or beep or other sounds, indicators provided via manual or mechanical gestures by the user or other devices, motion sensed by an appropriate motion sensor or camera included in the mobile system 1000 or accessible to the mobile system 1000, indicators provided via light sensing by an appropriate light sensor or camera included in the mobile system 1000 or accessible to the mobile system 1000, control indicators present in text input into the at least one input device via pasting the text including the search string text and indicators bounding the search string text, control indicators present in a video or audio or other data or media file including the search string text bounded by the control indicators, or any combination thereof. It should further be understood that the memory 1014 is operative to store necessary instructions executable by central processor 1016 to permit central processor 1016 to analyze the different types and forms of inputs to the at least one input device in order to recognize input control indicators and input search string text. Of course, these examples of control indicators are merely exemplary, and in other embodiments, other data, motions, sounds, graphics, or media may correspond to the control indicators.

In exemplary arrangements, the exemplary app is programmed to recognize the text following '#' or other control indicator and preceding '.' or other control indicator as a search string. The exemplary search string text may be any user selected and/or user arranged text, data, media, content, or indicia. As used herein, the term indicia may include, but is not limited to, any visual representation, text, data, media, or digital content. The exemplary search string text, for example, may be displayed in a different font, color or style to reflect its character as a search string in the messaging text entry field 12. The exemplary start and end control characters/indicators 14, 16 may be the same text or keyboard character or other form of indicator, although the exemplary coding capable of recognizing the bounds of the text search string in this instance might be somewhat more involved.

During use of the text messaging application configured according to the exemplary arrangements, the user enters (or selects) a recipient and then enters data into the text messaging text entry field 12. It will be appreciated that, as described below, the exemplary embodiments envisage all manners of entering text into a field, including without limitation data entry through the keyboard (typing), pasting text from a text buffer, entering data vocally using a voice recognition app, using a gesture or otherwise. However, these text entry methods are exemplary, and in other embodiments, other text or data entry methods may be used. For example, the search string text or data and the control indicators may be input to the at least one input device through a video recording or audio recording or live video or live audio that the microphone 1034 of the mobile system 1000 is operative to receive and/or that the camera is operative to capture and analyze, or an application is operative to recognize. The memory 1014 further includes instructions executable by the central processor 1016 to analyze the video or audio received through the microphone 1034 and/or camera, or application and to recognize data corresponding to the indicators 14 and 16 and to recognize the data or text between the indicators 14 and 16 as corresponding to the search string text. For example, the exemplary camera may be able to record or receive input data of a user mimicking handwriting on a device or any other gesture by the user, and the memory 1014 includes processor readable instructions executable by the central processor 1016 to recognize certain gestures to be associated with input of control indicators and other gestures or noises as corresponding to input of search string text input after input of a gesture corresponding to the start indicator and preceding an input corresponding to the end indicator. In other exemplary arrangements, the search string text and control characters may be input to the at least one input device through an audio recording or through live audio data that the microphone 1034 is operative to receive. The memory 1014 may further include instructions executable by the central processor 1016 to analyze the input audio recording or live audio data to recognize data corresponding to the indicators 14 and 16 and to recognize the data between the indicators 14 and 16 as corresponding to the search string text. In still further exemplary embodiments, the search string text and control indicators may be included in text pasted into a text entry field of the text entry application or included in a data or media file input into the text entry field of the text entry application, or otherwise entered into the at least one input device. The memory 1014 further includes instructions executable by the central processor 1016 operative to analyze the text pasted into the text entry field or the data or media files inserted into the text entry field for recognition of the data corresponding to the indicators 14 and 16 and to recognize the data included between the indicators 14 and 16 as corresponding to the search string text. It will be apparent from the descriptions of the exemplary embodiments provided herein that the control indicators and the search string text may be input into the at least one input device through any combination of input methods. That is, the control indicators and the search string text may be input into the at least one input device through any combination of but not limited to manual text entry, voice entry, live video entry, recorded video entry, live audio entry, recorded audio entry, entry via manual selection such as highlighting text already displayed through the screen or other methods of manual selection, entry via motion or gestures, entry via light signaling, entry via pasting copied text or data, and entry via a data or media file.

Figure 2:
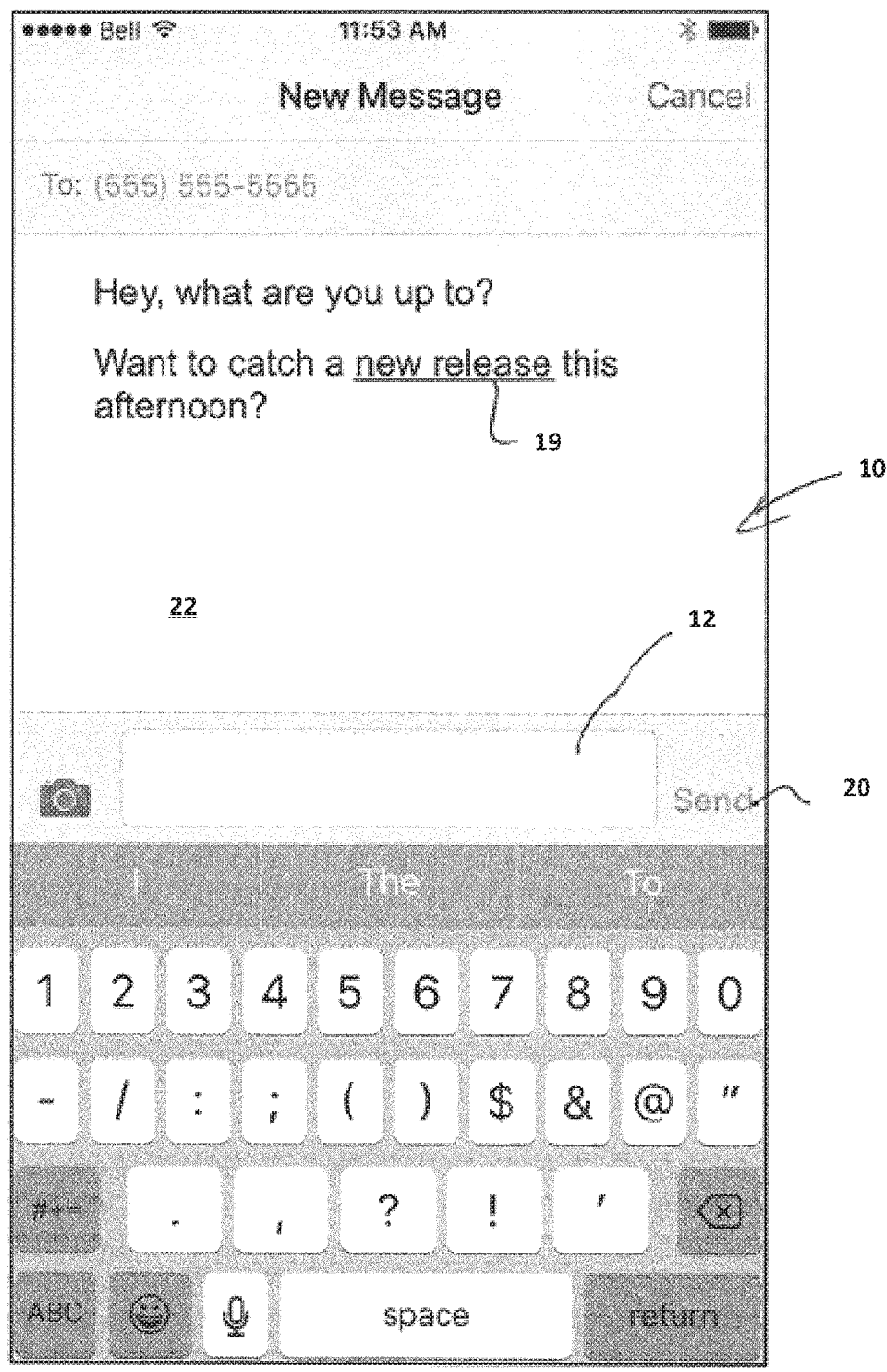
FIG. 2 is a screen shot of the exemplary user interface in the first app after the text message has been sent, showing a section of the text string converted to a hyperlink in the exemplary conversation window.

In exemplary arrangements, once the message with the search string, following '#' and preceding '.', or other control indicators, is sent by the user touching (or in the case of a physical keyboard, pressing, or other input methods as described above) the 'send' key 20, or other indication of 'send' or completion of entry, the search string is automatically displayed as a hyperlink 19 amongst the other words of the message in the message thread appearing in the exemplary message conversation window 22, as shown in FIG. 2. In alternative exemplary arrangements, the display of the hyperlink in the message thread may be associated simultaneously, or near simultaneously, with audio alerts, vibration or vibration patterns, screen flashing, screen animations, camera flashes, or any other alerts. In exemplary arrangements, the hyperlink appears in both the sender and receiver(s) conversation window. It will be understood that, in the event that the application used by the receiver(s) of the text message is configured to recognize the control characters, hyperlink 19 will appear to the receiver(s) and will be selectable to initiate the search. The receipt of the hyperlink by the receiver may also include such alerts as described above. However, in the event that the application used by a receiver of the text message is not configured to recognize the control characters (and accordingly to generate a hyperlink 19 accordingly), the text message with the control characters will be displayed to the user in non-hyperlinked (plain text) format. The display of the text along with the control characters bracketing it at the receiving end may cause a receiving user to question why the text is displayed that way and to investigate upgrading or changing the application in which such content is viewed to receive the benefit of the searchable hyperlink 19. For example, Apple's iMessage™ messaging application might be initially equipped on a particular iPhone according to the exemplary embodiments to display such hyperlinks 19 in an SMS message, but may be used to send such SMS messages to a receiver who owns, for example, a Blackberry™ Priv with a messaging application that is not so equipped. The receiver, not initially having an application equipped to view hyperlinked search text, will see the control characters and, being curious, may ask the sender why they are being displayed. The sender will likely recognize that the control characters he or she entered do not have the desired effect on the receiver's mobile device, will explain what they are for, and will accordingly encourage the receiver to consider downloading a new or upgraded messaging app for future use thereby to gain the advantage of the hyperlinked search text functionality. However, these embodiments are merely exemplary, and in other embodiments, other arrangements may be used. For example, the memory 1014 may include processor executable instructions that are operative to, in response to communications devices included in the mobile system 1000 communicating with the recipient device, cause the central processor 1016 to automatically recognize that the recipient device is not equipped with the exemplary embodiments or arrangements. The instructions may further cause the processor 1016 to recognize that the control indicators included in the message sent to the receiving device not equipped with the exemplary arrangement do not have the desired effect on the receiver's mobile device. Upon such recognition, the instructions may further be operative to cause the processor 1016 to automatically send to the recipient device a message describing the usefulness of the exemplary arrangement and include a link to a mobile device application store (app store) where the user of the receiving device may download or purchase a mobile device application including the exemplary arrangement, or a mobile device application including the exemplary arrangement that is operative to modify or alter the recipient device's default messaging application to implement the methods, processes, and operations of the exemplary arrangements. For example, if a user uploads a file including a video and it is played via the computing device or mobile device or through any software or website associated therewith or ran thereon, the audio associated with the video may include an output corresponding to a "start hyperlink" command, followed by an output corresponding to search string text such as "Michael Jackson Thriller", followed by an output corresponding to an "end hyperlink" command, the application according to the exemplary embodiment is operative to output a hyperlink corresponding to "Michael Jackson Thriller", and the web browser application would return results based on "Michael Jackson Thriller" once the hyperlink is selected in the application according the exemplary embodiment. For example, a YouTube™ video result is returned including a music video of Michael Jackson Thriller. It should further be understood that the application according the exemplary embodiment includes suitable instructions that are operative to analyze the video for motions such as gestures or other motion corresponding to the "start hyperlink" and "end hyperlink" commands, and to output a user selectable hyperlink corresponding to the audio output including search string text that is output between the recognized "start hyperlink" and "end hyperlink" commands.

In the exemplary arrangements, to initialize the system, the user may be requested to enter the URL of a search engine or web browser application, preferably when the user first installs the app including the exemplary arrangements, and may be asked to specify a default browser. The "preferences" options preferably allow the user to change these at any time. The user is then ready to start using the application according to the exemplary embodiments. However, the user may additionally select preferences corresponding to options such that when a hyperlink is selected by the user, the web search is initiated and performed through an external or other application in operative connection with the mobile system 1000 or stored thereon. For example, if the search string text includes an indication of the external or other application or of a search engine included as part of the external or other application on the user's mobile system 1000, selecting such a preference will cause the processor 1016 to run the search of the search string text in the external or other application. For example, if the search string text includes an indication of a YouTube™ mobile device application, and the mobile system 1000 is in operative connection with the YouTube™ application or the YouTube™ application is stored thereon, selection of the hyperlink will cause the processor 1016 to complete the web search in the YouTube™ application. It should be understood that this is merely exemplary, and in other embodiments, other arrangements may be used. It should further be understood that the preferences listed herein are nonlimiting, and the exemplary embodiments may provide the user with additional preferences for personalization and customization of the manner in which the methods, operations, and processes described in the exemplary embodiments are performed.

The exemplary search routine begins as the user clicks the hyperlinked search string 19 in the message thread of the messaging app 22 (see FIG. 2). The app coding then performs the following steps to yield the results illustrated in FIG. 3:
i copying the search text string within the message,
ii invoking a browser,
iii opening a search engine interface in a browser tab,
iv pasting the search text string into the search field of the search engine interface, and
v initiating a search to return results based on a search of the search text string.

Of course, this search routine is merely exemplary, and in other embodiments, other search routines may be used.

This exemplary search routine and method of presenting the search string text to the web application browser can be represented as:
"Copy" TEXT TO CLIPBOARD in the messaging app
"Open" (or "Maximize") BROWSER app
"Open" NEW TAB in the browser app
"Go To" URL [ . . . ] of the search interface of a designated search engine (for example Google, Yahoo, etc.)
"Go To" SEARCH FIELD in the search interface of the designated search engine
"Paste" TEXT FROM CLIPBOARD into the search field of the search interface
"Click" ENTER to initiate the search represented by the search text string.

However, it should be understood that other methods of presenting the search string text to a search engine interface or web browser application may be used. For example, presenting the search string text includes copying a search string text, invoking the web browser application, and causing the web browser application to invoke the search by presenting the search string text to a search engine interface to return the search results based on the search of the search string text. In alternative exemplary embodiments, presenting the search string text includes opening a search engine user interface in the web browser application, pasting the search string text into a search field of the search engine user interface, and invoking the search engine to return the search results based on the search of the search string text. In other alternative exemplary embodiments, presenting the search string text includes pasting the search string text into an address bar of the web browser application, and causing the web browser application to programmatically invoke the search using the search string text in the address bar of the web browser application. In further alternative exemplary embodiments, presenting the search string text includes automatically constructing and sending a programmatic call to a search engine application programming interface (API), and receiving and displaying through the user interface search results received from the API. In still further exemplary embodiments, presenting the search string text includes automatically creating a Uniform Resource Locator (URL) search query based on the search string text, pasting the URL search query into an address bar of the web browser application, and causing the web browser application to programmatically invoke the search using the URL search query in the address bar of the web browser application. Of course, it should be understood that these methods of presenting the search string text to a search engine or a web browser application are merely exemplary, and in other embodiments, other methods of presenting the search string text to a search engine or web browser application may be used.

In the exemplary embodiments the app is thus programmed to, merely upon the user clicking the "hyperlinked" search string 19 displayed in the message in the text messaging app conversation window 22 as shown in FIG. 2, automatically:
copy the hyperlinked text into the device's text buffer (or 'clipboard'), for example using the copy function native to the device's operating system; open the default browser; open a new tab in the browser;
enter the URL for the designated search engine and go to the browser search interface 30; paste the copied text search string 18 into the search engine interface search field 32; and enter the search string (i.e. emulate clicking 'return') to perform the search.

This exemplary routine reduces the number of keystrokes and display actions required to be performed by the user, facilitating the search while reducing the time required to enter the text search string (eliminating the redundancy of entering the search string twice), and by automatically toggling between apps to perform the search using the selected search string. This is particularly useful for the novice user, who may be unaccustomed to finding and switching back and forth between apps, but even skilled users will experience a time savings and reduced rate of typographical errors in the transposition of the search string from a text-based app to a search engine.

Figure 3:
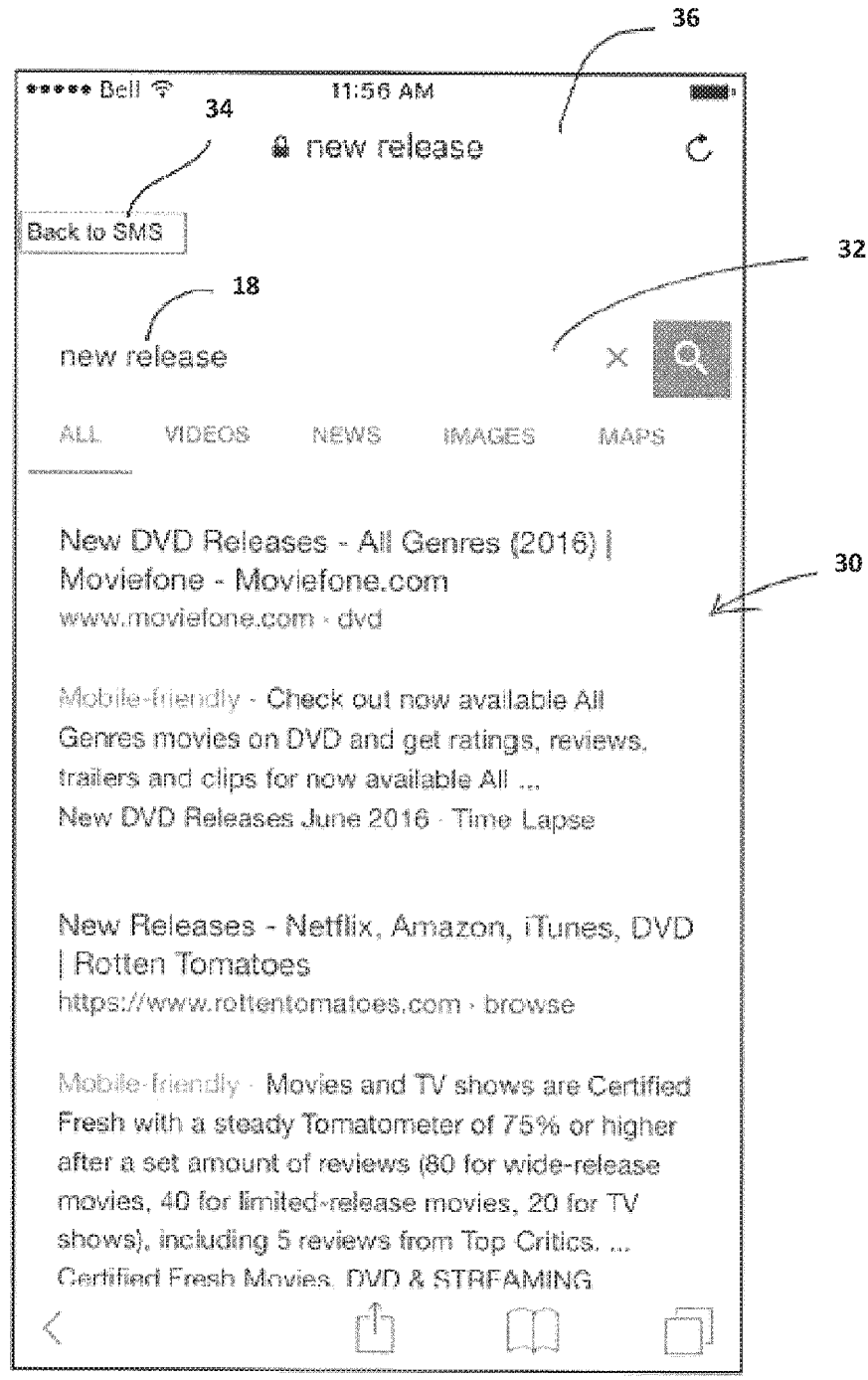
FIG. 3 is a screen shot of the exemplary user interface in a second app having a text entry field for receiving the search text string generated by the exemplary arrangements, and returning results from a search of the search text string.

In exemplary embodiments the exemplary browser, also referred to herein as web browser application, optionally provides a "Back to SMS" button 34, also referred to herein as a toggle button, shown in FIG. 3, which can be clicked by the user after viewing the search results in order to toggle back to the location of the corresponding hyperlink 19 in the text message in the text messaging program that was selected to invoke the search, allowing the user to continue the text conversation, for example conveying to the recipient the information learned about the conversational topic from the search. The toggle button 34 may be output through the user interface and displayed on the screen as a user selectable option. User selection of the toggle button causes the user interface output through the screen to change between output of at least some of the received results of the search and output of the text entry application. To do so, the memory 1014 may include further processor readable instructions executable by the central processor 1016 operative to output the toggle button 34 through a user interface of the mobile device. In other exemplary arrangements, the software code for the communications application or text entry application may include instructions executable by the central processor 1016 to display the toggle button 34 and to continue to display the toggle button 34 when the web browser application is displayed on the screen such that, upon an input to the at least one input device corresponding to user selection of the toggle button 34, the user may switch between the screen view of results of the web search in the web browser application and the screen view of the communications application or text entry application. It will be understood that, in exemplary embodiments in which the browser is invoked as described above from a different program—one that would not be referred to as an SMS program—the back button 34 may display a slightly different message appropriate to the program to which button 34 would return a user. It will also be understood that some devices use a general back button as part of their user interface navigation (i.e. Android™, Blackberry™ etc.), to achieve a similar result. The exemplary embodiments may be coded to employ such a button/function for these devices to enable the user to achieve a similar result as described above.

In exemplary embodiments, each new browser tab invoked by the app of the exemplary arrangement may be linked to the corresponding text search string 18 that was typed into the text messaging app text field 12, moved to the conversation thread in the window 22 when sent to the recipient where the text search string 19 is preferably identified as a link, and clicked to generate that particular search. These links can be stored in a buffer, such that for every text search string 19 there is one associated browser tab. In these exemplary embodiments, if the user clicks the same text search string 19 again in the conversation window 22 of the text messaging program, the device toggles to the existing tab for the text search string 19 by default, to reduce processing time and downloading latency. However, if the tab associated with that text search string 19 had been closed by the user, the process described above can simply repeat and a new tab will be opened to perform the search again using the sent text search string.

The exemplary embodiments provide opportunities for monetization, much the way that search engines do. Companies can purchase keywords, for example used at specific geo-locations, at specific time intervals to generate sponsored links or sponsored content, which are stored in a database by a system administrator. Each time a search is performed by the app of the exemplary embodiments, any keyword associated with a sponsor in the administrator database initiates a subroutine that returns a hyperlink to a URL designated by the sponsor in preference to the hyperlinks returned by the search. For example, the sponsored links may appear above the list of hyperlinks returned, or may be distinguished in some way from the results returned by the search, in the same manner as search engines currently do.

For example, rather than displaying the search engine results page directly, the app can programmatically receive the search results, scrub the hits returned by the search engine, and automatically generate an HTML page similar to what the search engine would have provided by emulating it, so as to list sponsored links at the top of the list of hits and display the search engine results as secondary hyperlinks after the sponsored hyperlinks. This may be done, for example, by adding the following steps after or upon initiating the browser search:

"Buffer" KEYWORD, GEO-LOCATION & TIME for comparison with sponsored keywords
"Go To" LOOKUP TABLE containing sponsored keywords
"Compare" KEYWORD, GEO-LOCATION & TIME to stored keywords, geo-location and time
If KEYWORD matches STORED KEYWORD:
"Get" HYPERLINK associated with keyword and request and receive search results from the search engine
"Scrub" SEARCH RESULTS from what is received from the search engine
"Generate" RESULTS LIST including associated sponsored hyperlink and search results "List" SPONSORED HYPERLINK in results list first
"List" SEARCH RESULTS below sponsored hyperlink.

In other exemplary embodiments, entities that purchase keywords may have stored data corresponding to the user, including data corresponding to previous searches, data corresponding to search preferences, data corresponding to styles, brands, or shopping tendencies, and/or other stored data corresponding to such user personal preferences, habits, and tendencies. Entities can pay a premium such that each time a search is performed by the app of the exemplary embodiment, any keyword associated with that premium paying entity initiates a subroutine that returns a hyperlink to a URL designated by the premium paying entity in preference to the other hyperlinks returned by the search of the keyword. In still further exemplary embodiments, the results returned may be arranged according to data corresponding to the user to target the user's preferences and provide the most relevant and user desired results at the top of the list of returned results. Of course, in other exemplary embodiments, other methods of arranging and outputting results of the web search may be used.

In an alternate exemplary embodiment, instead of recognizing the text following the start control character 14 and preceding the end control character 16 as a search string and utilizing the search field of a search engine, an app for performing the exemplary embodiment could be coded to recognize the text following the start control character 14 and preceding the end control character 16 as including an indication of a URL and a search text string. In this alternative exemplary embodiment, when the 'send' button is clicked by the user instead of or in addition to displaying the search text string as a hyperlink in the message in the message thread, the app may open a new tab in the browser and paste the URL into the address bar in order to proceed directly to the specified search engine web site at that URL and to initiate the search using that search engine for the search text. This would allow the user to specify or indicate a search engine on an ad hoc basis (or to specify another kind of website or platform or external or other application that can accept arguments in a URL query). For example, a user may enter "Google Pizza Place" in between the start and end control characters, and the search may be automatically commenced once the hyperlinked text is selected, by the application having parsed or analyzed the text and recognized Google as being a website that can be identified by URL as https://www.google.ca, or another URL corresponding to Google™, and the search text as "Pizza Place". The exemplary application may maintain a table of popular search engine or website names (Google™, Yahoo™, Bing™ etc.) and their associated URLs for this purpose. The application accordingly would launch a new tab in the browser once the hyperlink was selected, and would construct and paste "https://www.google.ca/search?&q=pizza+place" or similar into the address bar thereby to both navigate to the Google™ search website stored in the table and to cause the Google™ search website to conduct the search using search text "Pizza Place" as query arguments. In other exemplary embodiments, the text "Google Pizza Place" would be hyperlinked. In still other exemplary embodiments, just the text "Pizza Place" would be hyperlinked in the message thread, with the word "Google" being treated more programmatically as described above but kept from being displayed once the search text string has been hyperlinked. It should be understood that other methods of parsing and analyzing the search string text and implementing the exemplary embodiments described herein may be used.

Similarly, a user may enter "Yahoo Pizza Place" in between the start and end control characters, and the search may be automatically commenced by the application parsing or analyzing the search text and recognizing Yahoo™ as being a website that can be identified by URL as https://ca.search.yahoo.com/search, or any URL corresponding to Yahoo, and the search text as "Pizza Place". The exemplary application accordingly would launch a new tab in the browser and would construct and paste "https://ca.search.yahoo.com/search?p=Pizza+Place" or similar into the address bar thereby to both navigate to the Yahoo search website and to cause the Yahoo™ search website to conduct the search using search text "Pizza Place". It should be understood that other data, indicia, or content may be input between the start and end control indicators. The application according to the exemplary embodiments is operative to analyze such data, indicia, or content using instructions stored on the memory 1014 executable by central processor 1016, other software, or artificial intelligence devices in operative connection with the mobile system 1000. The central processor 1016 is further operative to invoke a web search corresponding to the data, indicia, or content in response to such instructions, other software, or artificial intelligence devices. For example, a user may input as the search string text, an emoji such as a pizza emoji or drinks emoji, or any emoji available to the user, and to cause the search engine or a web browser application to conduct the search corresponding to such emoji.

Similarly, the exemplary application may further recognize the word "Place" or synonyms thereof, or an emoji depicting a map or other emoji, in the search text "Google Pizza Place", or in a search string text including "Google 'pizza emoji' and 'map emoji'", or in a search string text including "Google 'drinks emoji' and 'map emoji'", and the search may be automatically commenced by the application according to the exemplary embodiments recognizing Google™ as being a website that can be identified by URL but also that, because the word "Place" or "map emoji" was in the search text that a specific sub-type of search—for example a search for nearby places using, Apple Maps™ or Google Maps™—as the most appropriate search to automatically conduct. In the case of Google Maps™, the application would accordingly launch a new tab in the browser and would both construct and paste "https://www.google.ca/maps/search/pizza+place/@43.6314022,-79.3941305", or similar URL based on the data, indicia, or content including an indication of search engine and location entered in the search string text, or adjacent the search string text into the address bar. Thereby, to navigate to the Google Maps™ search website and to cause the Google Maps™ search website to conduct the search using the search text "Pizza Place" or "'pizza emoji' and 'map emoji'" and information about the current location of the device on which the application is running (referring to the @43.631 . . . -79.394 . . . appended to the example URL above). The exemplary application may maintain a table of multiple sub-types associated with particular keywords such as "Place", "Location" or particular emojis such as "map emoji", "pizza emoji", "drinks emoji" or any other emoji available to the user, either in association with each search engine or by itself allowing for selection of the search engine and/or subtype of search. In exemplary arrangements, the user may be able to set such subtype searches by assigning certain keywords or emojis to correspond to certain search criteria, or to alter the subtype tables in the preferences section of the application according to the exemplary embodiments. Other sub-types, such as those relating to time or other factors relating to the type of search results intended may be maintained in association with each search engine or by themselves. These could permit a user to select the search engine and/or a subtype of search which is maintained in connection with other keywords, such as the word "seen" in the search text string "Have you seen Rihanna's hair lately?" to trigger an image search from Google™ rather than a search through all content, or the word "play" in the search text string "Gerald Clayton can really play the blues." to trigger a video search from Google™ rather than a search through all content. It should be understood that such subtype searches may be performed alternatively by inputting emojis into the text entry application rather than words. Alternatively, or in some combination, in exemplary embodiments, the application is triggered to insert location information into the search query according to indications in the search text string itself. For example "Let's grab #pizza near me." would cause the application on the sender's device to, triggered from the "near me" portion or a synonym thereof or an emoji corresponding to "near me", insert geo-location information corresponding to the sender's current location. On the other hand "Let's grab #pizza near you." would cause the application on the sender's device to, triggered from the "near you" portion or a synonym thereof or emoji corresponding to "near you", put in a placeholder in the location information variable/argument of the search query, so that the application on the receiver's device could insert the receiver device's location information only once the message was received at the receiver's device. The receiving user could click the hyperlink and have the search query conducted using the receiving device's geo-location information. In the event the original receiver responds to the original message from the original sender, such geo-location information could automatically be sent back to the original sender to update the placeholder in the search query hyperlinked on the original sender's device with the original receiver's device geo-location information, thereby to enable the original sender to click the hyperlink and conduct his or her own search for pizza places that are actually near to the original receiver. Restrictions on location privacy, whether user-selected or legislated, should be factored in implementations of this aspect of the exemplary arrangements. However, it should be understood that these methods and processes are merely exemplary, and in other arrangements, other methods and processes may be used.

In exemplary embodiments, the actual location information may be gleaned from a global positioning system in operative connection with, or of the device or devices themselves, or be automatically inserted by the search website using network data information corresponding to the device-server communications. For example, the geolocation information may be automatically determined by either the senders or the receiver's device in operative connection with the global positioning system (GPS), and the location information may be embedded into or indicated in the search string text, thereby selection of the hyperlink is operative to invoke the search of the search string text based on the location embedded or indicated in the search string text and to return results corresponding to areas within a set proximity of the embedded or indicated location. However, other methods of collecting location information may be used, such as location information determined by external or other applications stored on the mobile device. Of course these methods of collecting and implementing location information are merely exemplary, and in other embodiments, other methods of collecting and implementing location information may be used.

In other exemplary embodiments, in the event that the user, upon entering such a search string bracketed with control characters causing the search text string to be hyperlinked, decides to delete or otherwise edit the search text string prior to sending the message or otherwise confirming the search text string, the application may permit this even though it had already hyperlinked the text. For example, the user could press the delete button after having entered the end control character to backtrack through the search string. Once the exemplary application recognizes this action (deletion of the end control character), it will automatically display the entire search string (minus any of the actual search text string that has additionally been deleted) inclusive of (per the example above) the "Google" text preceding the "Pizza Place" text, thereby providing the user with fuller control over editing or deleting the entire search text string. For example, in a scenario whereby the search text string is hyperlinked and displays as follows "Let's find some Pizza Place John", the user pressing delete through the word "John" to edit the text to be "Let's find some Pizza Place Joh" and then "Let's find some Pizza Place", will have displayed to him/her with an additional delete action (that effectively deletes the end control character): "Let's find some Google Pizza Place" (the end control character now removed and thus the hyperlinking removed) which the user may ultimately see fit to change to something like: "Let's find some Yahoo Pizza Joint" which would be displayed after the end control character was re-entered as "Let's find some Pizza Joint" but, as described above, with an HTML query to the Yahoo search engine and with a different search text string. In this way, the user is provided with a convenient interface for both creating the hyperlinks as described as well as editing them. However, in the messaging application scenario, once the message is sent it would generally not be editable again by either the sender or the receiver. It should be understood from the description of the exemplary embodiments described herein that the application according to the exemplary embodiments may include instructions in the memory 1014 operative to cause the central processor 1016 to parse or analyze the search string text for an indication of a specific recipient of the text message, or message including the search string text bounded by the control indicators. For example, prior to selecting an intended recipient, the search string text "Let's find some Pizza Place John" is input into the at least one input device. The central processor 1016 according to the exemplary application may operatively communicate with a contacts application or contact stored in the memory 1014 of the mobile device and the central processor 1016 may further cause the input search string text and control characters to be sent as a hyperlink to the contact corresponding to "John". The "John" portion of the search string text may be treated more programmatically as described above, similar to the treatment of "Google" in the search string text, and "John" would not be displayed as part of the hyperlink sent to the intended recipient. However, these methods and processes for analyzing the search string text for an indication of a specific recipient are merely exemplary, and in other embodiments, other methods and processes for analyzing the search string text for an indication of a specific recipient may be used.

In exemplary embodiments, the user who has entered the text may be automatically navigated to a browser per the search text string and any other arguments, once he or she has pressed the Send button. In this way, the sender simultaneously sends the message to the intended receiver and triggers the search for the sender at the same time. Once the message is received at its destination, being hyperlinked, the search can also be triggered by the receiving person on the receiver person's device as described. As will be understood, the generation of a search query that can be used identically by both the sender and the receiver in this way will increase the likelihood that the same search query will be conducted more than once. This could have implications for advertising "click" revenue, but may also have implications for data mining by the search engine which may be able to infer a conversation between two or more devices making the exact same queries of the search engine.

To further this, in exemplary embodiments the search query generated as described above from a given search text string is supplemented with a search query identifier in the HTML. For example, the application generates the following search query: "https://www.google.ca/search?&q=pizza+place" or similar and may also be configured to append a unique search identifier argument to the query by combining the MAC address of the sender device, a timestamp, or some other differentiator that can distinguish the query from other, unrelated, searchers' similar queries. For example, the search query may be augmented automatically by the sender's device to be https://www.google.ca/search?&q=pizza+place&SID=14ac2954378 or similar with the "SID=14ac2954378" portion referring to a search ID variable/argument (automatically generated by the application) that the search engine can parse as an argument to the search. While such a search ID variable/argument would not be part of the search string text the search itself would be based on, should the same query come to the search engine from another device the search engine would be able to infer sender and receiver devices through the common search ID and search text string itself. It is unlikely that a search engine could infer such a relationship from just the search text string since very many unrelated people may be simultaneously searching for the same thing (a pizza place, for example, or information about a new Grammy winner just awarded). In this way, provided search queries are conducted, the search engine could infer relationships between querying devices (and their users), without having to have any direct access to the telecommunications networks upon which the devices are transmitting and receiving their messages. In a similar manner, outside of the text messaging application, such a search ID could be used to infer relationships between querying devices on which copies of an original document (such as a Word document) containing such a search query has been saved. Furthermore, information about the messaging or other application could be sent along with the query as an argument thereby to enable the search engine to be aware that the search query came through ultimately from that application, and was not entered manually by a user at the search engine user interface through the browser.

Variations are possible. For example, in alternative exemplary embodiments, a user interface element such as a button or gesture recognition etc. enables a user to toggle between a search text mode and a query mode so the user can choose whether the search is to automatically occur upon pressing Send, or whether actual clicking of the hyperlink is required.

In one exemplary embodiment, the end control character 16 can be a space. In this exemplary embodiment, a start control character, for example a hash tag (#), can be used to designate the start of the search string. As long as no spaces are used in the search string 18, the app coding could identify all words following the start control character 14 (with no spaces between words) and preceding the next space as the search string to be displayed as a hyperlink 19 in the conversation thread window 22 and copied and pasted into the search bar when the hyperlink 19 is clicked. Although, depending on the search being requested, there can be some ambiguity in this exemplary embodiment, some search engines are sufficiently advanced as to recognize and parse the words in a search string, in many cases, even if the words are pasted into the search field with no spaces in between words. Thus, the effectiveness of this exemplary embodiment may depend on the particular search requested and the robustness of the search engine. It is recognized that other applications, such as Twitter and other social media applications, "hashtagging" using #for tracking and identifying buzzwords and the trends they identify is very common. As such, while the start control character could be a hash tag and the end control character a space, it may be useful to reduce any confusion for users who are familiar with and using such other applications, by providing the disclosed functionality using a different start control character than a hashtag, when applying the exemplary arrangements to these applications.

In an alternative exemplary embodiment, a new function can be created on the keyboard or in the text messaging app that can be triggered on and off by a button, gesture, command or voice command, sensed motion or sensed light, etc., to add a special feature to the text being entered, either visible or latent, to invoke the method of the exemplary embodiments. For example, as a start control character 14 the function can be engaged to identify the text entered while engaged to be a search string, and then disengaged to mark the end of the search string. This enables the app's programming to identify which text or words to copy into the text buffer as a search string. Similarly a button having a functionality unique to the exemplary embodiments, such as a "HYPER Text" button which the user engages in order to identify that the words or text which follow until the button is disengaged are to be designated as a hyperlink 19 and to be copied and presented to the search engine, would obviate the need for a user to type actual start and end control characters 14 and 16 to bracket the search text when the search text is being entered. As well, the "HYPER Text" button can be selected by the user to hyperlink a section of text the user had already entered. For example the user may have entered "Let's grab pizza near me", and may realize they would like to hyperlink "pizza near me" as to utilize the searchable hyperlink functionality of the exemplary embodiment, therefore the user may highlight the text "pizza near me" and select the "HYPER Text" button, and the first and second indicators will be added respectively to the start and end of the text "pizza near me", thus creating a hyperlink of the text. The HYPER Text button may also be used to remove an already hyperlinked text as well, by the user highlighting an already hyperlinked text, and selecting the HYPER Text button, which in this example would remove the first and second indicators bracketing the search string text, therefore making the highlighted hyperlinked text plain text.

For example, in this exemplary embodiment, the user pressing the "HYPER Text" button would put the app in a condition to insert a start control character and the user pressing that button again would insert an end control character, provided some search text had been inserted. In the event that no search text was inserted, then the app might remove the already-inserted start control character and would not insert an end control character when the "HYPER Text" button was pressed again to disengage. It should be understood that, in other exemplary alternative embodiments, the action of the user pressing the button corresponding to "HYPER text" may be replaced with the user speaking into the microphone 1034 of the mobile system 1000 the words "start hyperlink" to correspond to the first control indicator, and the user then may speak the words "end hyperlink" to correspond to the second control indicator. In this exemplary embodiment, the application according to the exemplary embodiments is operative to recognize via operations, performed by the central processor 1016 in response to instructions included on the memory 1014, that the text spoken into the microphone 1034 in between the spoken words "start hyperlink" and "end hyperlink" corresponds to the search string text to be searched. It should be further understood that the control indicators and search string text may be input through video, motion, light, or other types of signals which the mobile device 1000 and associated or included components can be configured to recognize as data corresponding indicators and search string text, as previously described.

Because in exemplary embodiments involving a "HYPER Text" button or similar tool for invoking a search text mode a user would not have to manually type control characters, such control characters could themselves be kept invisible to a user, with a different kind of visual indication being provided to the user in the form of an underline and/or color and/or some other cue of the actual search text. For example, the control characters could be formed and treated similarly to tags in a markup language (such as the underlying text "<HT_BUTTON_ON> Mission Impossible Movie <HT_BUTTON_OFF>" being displayed as "MISSION IMPOSSIBLE MOVIE" or "Mission Impossible Movie" or "Mission Impossible Movie" where the search text itself is "Mission Impossible Movie". In exemplary embodiments, a user can choose how search text is to be displayed on his or her device. However, it should be understood that the hyperlink may be displayed as the search string text by itself, the search string text bounded by the control indicators, or other data, media, indicia, or content. Of course, these ways in which the hyperlink may be displayed are merely exemplary, and in other embodiments, other ways of displaying the hyperlink may be used.

While in the exemplary embodiments described above, a default browser is opened and the browser is automatically directed to navigate to the URL of the selected search engine to enter the search string into the search field of the resultant HTML page for the search engine, alternative exemplary methods and processes of presenting the search string text to the search engine interface or the web browser application are possible. For example, in the event that the default browser to be opened has an address bar that is configured to function both as a URL-entry field and as a search-string entry field, the search may be invoked via the browser address bar by the app automatically invoking the browser with instructions to enter the search string from the text message into the address bar of the browser when the user clicks the hyperlinked text in the conversation thread thereby to invoke the search. The entry of the search string into the address bar causes the browser to programmatically initiate the search by the browser formulating the programmatic call to an API (Application Programming Interface) of the search engine (such as Google™) or alternatively by itself automatically retrieving the search engine user interface search page, pasting what is in its address bar into the search field and initiating the search.

While, in exemplary embodiments described above, a browser is opened when a user clicks the hyperlinked text in the text message, alternative exemplary arrangements are possible for presenting the search string text to the web browser application. For example, presenting the search string text to the web browser application may be achieved by the messaging app being configured to structure search requests programmatically itself thereby to make calls to a search engine server directly via HTTP rather than having to open an actual browser, and to itself receive the search results for display by the messaging app. Such programmatic access to search results may be done by the messaging app automatically constructing and sending calls to one or more of many APIs (Application Programming Interfaces) of a search provider, such as Google™ This may be done by simply mimicking the HTTP "GET" command that a straightforward search engine user interface might automatically construct employing text entered into a search field as GET command arguments, or by understanding a slightly more complex (though well understood) process such as by constructing a JSON (JavaScript Object Notation) or XML (eXtensible Markup Language) call to a more sophisticated search engine API. This alternative exemplary arrangement of presenting the search string text to the web browser application may be useful in the event that the messaging app (or whichever app is configured with the method of the exemplary arrangements, to structure text to be searched as hyperlinks) is itself configured to display such search results in-line with the text message itself, rather than within the browser app, or to filter or format the search request or the search results in some appropriate way. For example, clicking the hyperlinked text may not only invoke a programmatic search, but allow toggling between viewing the text messages with hyperlinks, and the text messages with hyperlinks in addition to the search results themselves, allowing a user to toggle between seeing the search results fully or partially displayed within the conversation itself, or simply seeing the selectable hyperlinks which, when selected, reveal the in-line search results. Variations of this exemplary arrangement are possible.

While the exemplary embodiments disclosed herein are well-suited to applications being operated on mobile devices, and particularly for messaging applications on mobile devices, it will be understood that the principals described herein may be employed in messaging applications running on other kinds of devices, such as but not limited to desktop computers, laptop computers, and/or in other kinds of applications involving text entry in which automatic hyperlinking of search text bracketed with control characters for the purpose of enabling a viewer of a document or other collection of text to invoke searches may be useful. For example, bracketing search text with control characters as described above in a word processing application such as Microsoft Word™, or a spread sheeting application such as Microsoft Excel™, or in a presentation application such as Microsoft PowerPoint™, and so forth, may be useful. In such alternative exemplary embodiments, rather than the user pressing "Send" as one might do for a messaging application, the process of converting the entered text bracketed by control characters to a hyperlink could be activated by the user taking some other activating action indicating the end of a search string with control characters, such as the user entering a space after the end control character (i.e. in embodiments above, the '.' following the search text preceded by a '#'). A subsequent viewer of the document, such as the author or another person, would be able to select the automatically-created hyperlink thereby to invoke the search in one or more of the manners described herein. It should further be understood that any application, communications application software, or user interface may be configured with or modified to apply the methods, operations, and processes of the exemplary embodiments described herein. For example, the methods, operations, and processes of the exemplary embodiments may be applied to or used to modify, as previously described, but not limited to, word processors such as Microsoft Word™ and Google Word™, Excel applications such as Microsoft Excel™ and Google Excel™, presentation applications such as Microsoft PowerPoint™ and Google PowerPoint™, PDF applications, note applications such as Microsoft One Note™ and Evernote™, enterprise software suites such as Microsoft Office Suite™, Google Suite™, Google Docs™, Microsoft 365™, text messaging applications, SMS messaging applications, instant messaging applications such as WhatsApp™, Facebook Messenger™, Telegram™, WeChat™, Viber™, messaging applications such as Apple iMessage™, Google Messages™, Samsung Messages™, email applications such as Gmail™, Hotmail™, Yahoo Mail™, Apple Mail™, enterprise email accounts, Microsoft Outlook™, chat applications such as chats on websites or chatbots, website forums or forum applications such as Reddit™ or Quora™, blogs such as Wordpress™, Tumbler™, Blogger™, Medium™, Wix Blog™, social media applications or websites such as Facebook™, Instagram™, LinkedIn™, Snapchat™, TikTok™, Twitter™, chat rooms, dating apps such as Tinder™, Bumble™, Hinge™, Plenty of Fish™, Match™, Badoo™, videogame chats such as Twitch™, Discord™, Call of Duty™, World of Warcraft™, Fortnite™, enterprise chat applications such as Slack™ Microsoft Teams™, Facebook Messenger™ for Business, WhatsApp™ for Business, Google Chat™, website builders such as Wix™, Squarespace™, Shopify™ Wordpress™, user profile pages for such websites, applications, and software, audio applications for audio communication, streaming, players, or recording such as Bumble Voice Chat™, Bumble Voice Note™, Hinge Voice Chat™, Hinge Voice Note™ WhatsApp Voice Call™, WhatsApp Voice Note™, podcast recording, audio players, Spotify™, TikTok™, Facebook Messenger Voice Chat™, Twitch™, Discord™ phone/voice calls, voice streaming, voice recordings, voicemail, voice note applications, live multiplayer video gaming, video applications for video communication, streaming, players, or recording such as FaceTime™, TikTok™, WhatsApp Video Call™, Skype™ Google Duo™, Instagram Stories™, Instagram Videos™, Instagram Live Stream/TV™, Instagram Reel™, Instagram Video Chat™, Zoom™, Snapchat™, Snapchat Video Call™, Snapchat video Sharing™, Bumble Video Chat™, Hinge Video Chat™, Twitch™, Discord™, YouTube™, Vlog Recordings™, podcast recordings with video, video calls, Facebook Messenger Video Chat™, video streaming, broadcast TV, video notes, and House Party™, calendar applications and calendar websites such as Google Calendar™ Apple Calendar™, Outlook Calendar™, productivity and project management applications such as Asana™, Monday™, as well as survey and fillable forms applications and websites.

From the various exemplary embodiments, having been thus described in detail by way of example, it will be apparent to those skilled in the art that variations and modifications may be made without departing from the scope of the exemplary embodiments and exemplary arrangements described herein. The exemplary embodiments include all such variations and modifications as fall within the scope of the appended claims. Thus, the exemplary embodiments described herein achieve improved operation, eliminate difficulties encountered in the use of prior devices and systems, and attain the useful results described herein. In the foregoing description, certain terms have been used for brevity, clarity and understanding. However, no unnecessary limitations are to be implied therefrom because such terms are used for descriptive purposes and are intended to be broadly construed. Moreover, the descriptions and illustrations herein are by way of examples and the inventive features are not limited to the features shown and described. Further, in the following claims, any feature described as a means for performing a function or operation shall be construed as encompassing any means known to those skilled in the art as being capable of carrying out the recited function or operation and shall not be deemed limited to the particular means shown or described for performing the recited function or operation in the foregoing description or in equivalents thereof. It should be understood that features and/or relationships associated with one embodiment can be combined with features and/or relationships from another embodiment. That is, various features and/or relationships from various embodiments can be combined in further embodiments. The inventive scope of the disclosure is not limited to only the embodiments shown or described herein. The term "non-transitory" with regard to a computer readable medium is intended to exclude only the subject matter of a transitory signal, per se, where the medium itself is transitory. The term "non-transitory" is not intended to exclude any other form of computer readable media, including but not limited to, media comprising data that is only temporarily stored or stored in a transitory fashion. Should the law change to allow computer readable medium itself to be transitory signals, then this exclusion is no longer valid or binding. Having described the features, discoveries, and principles of the exemplary embodiments, the manner in which they are constructed and operated, and the advantages and useful results attained, the new and useful structures, devices, elements, arrangements, parts, combinations, systems, equipment, operations, methods, processes, and relationships are set forth in the appended claims.

What is claimed is:

1. A non-transitory processor readable medium embodying computer program instructions, wherein the instructions are operative to cause at least one processor of a computing device to carry out steps, comprising:
   (a) causing to be assigned within a text entry application a text string start indicator and a text string end indicator,
   (b) enabling receipt from a user of the computing device into the text entry application through at least one input device of the computing device, user entered text, wherein the user entered text includes therein as a subset thereof the text string start indicator, then immediately thereafter search string text, and then immediately thereafter the text string end indicator,
      wherein search string text includes a plurality of characters selected and arranged by the user,
   (c) responsive at least in part to receipt of the text string start indicator, the search string text, and the text string end indicator in (b), automatically providing through at least one output device of the computing device,
      a user interface output,
      wherein the user interface output includes output text that includes in order the text string start indicator, then immediately thereafter the search string text, and then immediately thereafter the text string end indicator wherein the search string text, is displayed as a hyperlink,
   (d) enabling receipt of at least one input through the at least one input device corresponding to user selection of the hyperlink in the user interface output,
   (e) responsive at least in part to receipt of the at least one input to the at least one input device corresponding to user selection of the hyperlink,
      (i) automatically communicating via a web browser application,
      (ii) invoking in the web browser application a web search based on the search string text,
      (iii) receiving results of the web search invoked in (e)(ii), and
      (iv) outputting through the at least one output device, indicia corresponding to at least a portion of the results of the web search received in (e)(iii).

2. The non-transitory processor readable medium according to claim 1
   wherein (e)(ii) includes
      presenting the search string text to the web browser application,
      wherein invoking the web search is carried out responsive at least in part to presenting the search string text to the web browser application.

3. The non-transitory processor readable medium according to claim 2
   wherein (e)(ii) includes
      analyzing the presented search string text for an indication of a specified search engine,
      determining responsive to the analysis that the search string text includes the indication of the specified search engine, and
      responsive at least in part to the determination, causing the web browser application to invoke the web search of the search string text using the specified search engine.

4. The non-transitory processor readable medium according to claim 3
   wherein (e)(ii) includes causing the web browser application to invoke the web search of the search string text based on a location and to return results corresponding to areas within a set proximity of the location,
   wherein the location is provided through
      the user entered text received in (b) including an indication of the location, or
      the computing device automatically providing data corresponding to the location in correlated relation with the search string text.

5. The non-transitory processor readable medium according to claim 4
   wherein (e)(iv) includes outputting the indicia corresponding to the at least a portion of the results in at least one of
      a new tab, or
      a new window,
   of the web browser application, wherein the at least one of the new tab or the new window is output through the at least one output device.

6. The non-transitory processor readable medium according to claim 5
   wherein (e)(iv) includes outputting through the at least one output device, a user selectable toggle button, wherein user selection of the toggle button causes the at least one output device to change between outputting the indicia corresponding to the at least a portion of the results of the web search and outputting the user interface output of the text entry application.

7. The non-transitory processor readable medium according to claim 6
   wherein in (c),
      the hyperlink included in the user interface output includes all the characters included in the search string text, and
      does not include the text string start indicator and the text string end indicator, wherein in (e),
the web browser application is a separate web browser application outside of the text entry application.

8. The non-transitory processor readable medium according to claim 7
wherein (b) includes enabling receipt from the user through the at least one input device, at least one of the text string start indicator, search string text, and the text string end indicator, via at least one of
manual text entry,
voice entry,
video entry,
audible input entry,
entry via manual selection,
entry via motion,
entry via light,
entry via pasting,
entry via a data or media file, or
any combination thereof.

9. The non-transitory processor readable medium according to claim 1
wherein in (c),
the hyperlink included in the user interface output
includes all characters included in the search string text, and
does not include the text string start indicator and the text string end indicator,
wherein in (e),
the web browser application is a separate web browser application outside of the text entry application.

10. The non-transitory processor readable medium according to claim 1
wherein (e)(iv) includes outputting through the at least one output device a user selectable toggle button, wherein user selection of the toggle button causes the at least one output device to change between outputting the indicia corresponding to the at least a portion of the results of the web search and outputting the user interface output of the text entry application.

11. A processor implemented method of improving a computing device by generating hyperlinks in a text entry application on the computing device, the method comprising:
(a) causing to be assigned within the text entry application a search string text start indicator and a search string text end indicator,
(b) enabling receipt from a user into the text entry application through at least one input device of the computing device, user entered text, wherein the user entered text includes therein as a subset thereof the search string text start indicator, then thereafter without intermediate searchable characters, search string text, and then thereafter without intermediate searchable characters, the search string text end indicator,
wherein the search string text comprises a plurality of user selected and arranged characters,
(c) responsive at least in part to receipt of the search string text start indicator, the search string text, and the search string text end indicator in (b), automatically generating a hyperlink corresponding to the search string text,
(d) outputting the user entered search string text start indicator, then thereafter without intermediate searchable characters, the search string text, and then thereafter without intermediate searchable characters, the search string text end indicator through at least one output device of the computing device with the hyperlink generated in (c) corresponding to the search string text indicated by a hyperlink output that includes the search string text,
wherein the hyperlink output is selectable via at least one input through the at least one input device,
(e) subsequent to (d), receiving at least one input through the at least one input device corresponding to selection of the hyperlink output,
(f) responsive at least in part to the at least one input received in (e),
(i) automatically invoking a web search in a web browser application using the search string text,
(ii) receiving results of the web search invoked in (f)(i), and
(iii) outputting at least a portion of the results of the web search received in (f)(ii) through the at least one output device.

12. The processor implemented method according to claim 11
wherein (f)(i) includes
presenting the search string text to the web browser application,
wherein the web search is invoked responsive at least in part to presenting the search string text to the web browser application.

13. The processor implemented method according to claim 12
wherein (f)(i) includes
analyzing the presented search string text for an indication of a specified search engine,
determining responsive to the analysis that the search string text includes the indication of the specified search engine, and
responsive at least in part to the determination causing the web browser application to invoke the web search of the search string text using the specified search engine.

14. The processor implemented method according to claim 13
wherein (f)(i) includes causing the web browser application to invoke the web search of the search string text based on a location and to return results corresponding to areas within a set proximity of the location,
wherein the location is provided through
the user entered text received in (b) including an indication of the location, or
the computing device automatically providing data corresponding to the location in correlated relation with the search string text.

15. The processor implemented method according to claim 14
wherein (f)(iii) includes outputting the received results in at least one of
a new tab, or
a new window,
of the web browser application, wherein the new tab or new window is output through the at least one output device.

16. The processor implemented method according to claim 15
wherein (f)(iii) includes outputting through the at least one output device a user selectable toggle button, wherein user selection of the toggle button causes the at least one output device to change between outputting the at least a portion of the received results of the web search results received in (f)(iii) and outputting the user entered text.

17. The processor implemented method according to claim 16
wherein in (d),
the hyperlink output through the at least one output device
includes all the characters included in the search string text, and
does not include the search string text start indicator and the search string text end indicator,
wherein in (f),
the web browser application is a separate web browser application outside of the text entry application.

18. The processor implemented method according to claim 11
wherein in (d),
the hyperlink output through the at least one output device
includes all the characters included in the search string text, and
does not include the search string text start indicator and the search string text end indicator,
wherein in (f),
the web browser application is a separate web browser application outside of the text entry application.

19. The processor implemented method according to claim 11
wherein (b) includes enabling receipt from the user into the text entry application through the at least one input device, at least one of the search string text start indicator, the search string text, and the search string text end indicator, via at least one of
manual text entry,
voice entry,
audible input entry,
video entry,
entry via manual selection,
entry via motion,
entry via light,
entry via pasting,
entry via a data or media file, or
any combination thereof.

20. A non-transitory processor readable medium embodying computer program instructions, wherein the instructions are operative to cause at least one processor of a computing device to carry out steps, comprising:
(a) causing to be assigned within a text entry application at least one search string text indicator,
(b) enabling receipt into the text entry application through at least one input device of the computing device, user entered text, wherein the user entered text includes as only a portion thereof the at least one search string text indicator and the search string text, wherein within the user entered text the at least one search string text indicator at least one of precedes and follows the search string text without searchable characters being intermediate of the search string text indicator and the search string text,
wherein search string text includes a plurality of user selected and arranged characters,
(c) responsive at least in part to receipt through the at least one input device of the at least one search string text indicator and the search string text in (b), automatically providing a user interface output through at least one output device of the computing device,
wherein the user interface output includes the user entered text with the search string text and the at least one search string text indicator included as a portion thereof, and a hyperlink within the user interface output of the user entered text that corresponds to the search string text,
(d) enabling receipt of at least one input through the at least one input device corresponding to user selection of the hyperlink in the user interface output,
(e) responsive at least in part to receipt of the at least one input in (d),
(i) carrying out responsive to operation of a web browser, a web search using the search string text,
(ii) receiving results of the web search, and
(iii) outputting through the at least one output device at least a portion of the results of the web search.

21. The non-transitory processor readable medium according to claim 20
wherein in (a), the at least one search string text indicator includes a text string start indicator and a text string end indicator,
wherein in (b), the user entered text includes as a subset thereof the text string start indicator, immediately followed by the search string text, immediately followed by the text string end indicator.

22. The non-transitory processor readable medium according to claim 21
wherein the steps further include
(f) enabling sending at least one wireless message from the computer device, wherein the at least one wireless message is operative to enable at least one output device of another computing device that receives the message, to output the user interface output.

23. The non-transitory processor readable medium according to claim 21
wherein in (f) the user interface output does not include the text string start indicator and the text string end indicator.

24. The non-transitory processor readable medium according to claim 21
wherein in (e) the web browser is included in the text entry application.

25. A non-transitory processor readable medium embodying computer program instructions, wherein the instructions are operative to cause at least one processor of a computing device to carry out steps, comprising:
(a) enabling receipt from a user of a computing device into a text entry application via inputs to at least one input device of the computing device, user entered text, wherein the user entered text includes as a subset thereof at least one search string start character, then immediately thereafter without intermediate searchable text, search string text, and then immediately thereafter without intermediate searchable text, at least one search string end character,
wherein the search string text includes a plurality of characters that are selected and arranged by the user,
(b) responsive at least in part to receipt of the at least one search string start character, the search string text, and the at least one search string end character in (a), automatically providing through at least one output device of the computing device,
a user interface output,
wherein the user interface output includes the user entered text including as a subset thereof in order, the at least one search string start character, then thereafter without intermediate searchable text, the search string text, and then thereafter without intermediate searchable text, the at least one search string end character, wherein in the user interface output the search string text is displayed as a hyperlink output,
(c) enabling receipt of at least one input through the at least one input device corresponding to user selection of a hyperlink output,
(d) responsive at least in part to the at least one input in (c),
　(i) automatically communicating via a web browser application,
　(ii) invoking in the web browser application a search based on the search string text,
　(iii) receiving the results of the web search invoked in (d) (ii), and
　(iv) outputting through the at least one output device, indicia corresponding to at least a portion of the results of the web search received in (d) (iii).

26. The non-transitory processor readable medium according to claim 25
　wherein the steps further include:
　　enabling receipt of at least one further input through the at least one user input device,
　　wherein the at least one further input is operative to cause the user entered text including the hyperlink to be sent wirelessly to another computing device remote from the computing device.

27. The non-transitory processor readable medium according to claim 25
　wherein the steps further include:
　　enabling receipt of at least one further input through the at least one user input device,
　　wherein the at least one further input is operative to cause at least one message including the user entered text including the hyperlink to be sent wirelessly from the computing device to another computing device remote from the computing device,
　　wherein the at least one message is operable to enable the user entered text and hyperlink to be displayed through a further output device of the further computing device without the at least one search string start character and the at least one search string end character.

28. A non-transitory processor readable medium embodying computer program instructions, wherein the instructions are operative to cause at least one processor of a computing device to carry out steps, comprising:

(a) enabling receipt from a user of a computing device into a text entry application via inputs to at least one input device of the computing device, user entered text, wherein the user entered text includes an initial portion of the user entered text, then thereafter at least one search string start character, then immediately thereafter without intermediate searchable text, search string text, and then immediately thereafter without intermediate searchable text, at least one search string end character, and then thereafter a remainder portion of the user entered text,
　wherein the search string text includes a plurality of characters that are selected and arranged by the user,
(b) responsive at least in part to receipt of the at least one search string start character, the search string text, and the at least one search string end character in (a), automatically providing through at least one output device of the computing device,
　a user interface output,
　wherein the user interface output includes as continuous output text, the initial portion of the user entered text entered prior to the at least one search string start character, then thereafter without intermediate searchable text, the search string text, and then thereafter without intermediate searchable text, the remainder portion of the user entered text entered after the at least one search string end character,
　wherein in the user interface output the search string text is displayed as a hyperlink output,
(c) enabling receipt of at least one input through the at least one input device corresponding to user selection of a hyperlink output,
(d) responsive at least in part to the at least one input in (c),
　(i) automatically communicating via a web browser application,
　(ii) invoking in the web browser application a search based on the search string text,
　(iii) receiving the results of the web search invoked in (d) (ii), and
　(iv) outputting through the at least one output device, indicia corresponding to at least a portion of the results of the web search received in (d) (iii).

* * * * *